United States Patent
Leonard et al.

(10) Patent No.: US 8,056,665 B2
(45) Date of Patent: Nov. 15, 2011

(54) MAGNETIC AIR CAR

(75) Inventors: Steven Leonard, San Jose, CA (US); Paul Donovan, Sunnyvale, CA (US)

(73) Assignee: Magnetic Air Motors, Ltd., San Jose, CA (US)

( * ) Notice: Subject to any disclaimer, the term of this patent is extended or adjusted under 35 U.S.C. 154(b) by 441 days.

(21) Appl. No.: 12/344,242

(22) Filed: Dec. 25, 2008

(65) Prior Publication Data

US 2010/0166576 A1    Jul. 1, 2010

(51) Int. Cl.
F04B 35/04 (2006.01)
(52) U.S. Cl. ............ 180/165; 60/412; 60/413; 180/307
(58) Field of Classification Search .......... 180/301–307, 180/165; 417/23.5, 12, 244, 248; 60/412, 60/413, 415; 92/DIG. 2
See application file for complete search history.

(56) References Cited

U.S. PATENT DOCUMENTS

| | | | | |
|---|---|---|---|---|
| 865,496 A * | 9/1907 | Till | | 60/412 |
| 3,882,950 A * | 5/1975 | Strohlein | | 180/165 |
| 3,980,152 A * | 9/1976 | Manor | | 180/313 |
| 4,043,126 A * | 8/1977 | Santos | | 60/407 |
| 4,163,367 A * | 8/1979 | Yeh | | 60/414 |
| 4,355,508 A * | 10/1982 | Blenke et al. | | 60/416 |
| 4,370,857 A * | 2/1983 | Miller | | 60/413 |
| 4,383,589 A * | 5/1983 | Fox | | 180/165 |
| 4,478,304 A * | 10/1984 | Delano | | 180/165 |
| 4,596,119 A * | 6/1986 | Johnson | | 60/407 |
| 5,460,239 A * | 10/1995 | Jensen | | 180/302 |
| 7,789,181 B1 * | 9/2010 | Schechter | | 180/165 |
| 7,926,610 B2 * | 4/2011 | Adli | | 180/302 |

* cited by examiner

*Primary Examiner* — J. Allen Shriver, II
*Assistant Examiner* — James Triggs
(74) *Attorney, Agent, or Firm* — Richard B. Main

(57) ABSTRACT

A magnetic air car uses a magnetic motor to compress input air and save moderately compressed high-pressure air in storage tanks. The compressor and storage tanks deliver the high-pressure working air and operational flows to several stages of compressors that boost the pressures during driving to very high-pressure, then ultra high-pressure, then super high-pressure, and finally to extremely high-pressure. A pneumatic torque converter uses jets of the extremely high-pressure to turn an input shaft of a transmission and differential. These, in turn, drive the powered wheels of a car. The compressors float a connecting shaft with matching vanes and impellers on opposite ends on air bearings to reduce shaft turning friction to near zero. The balance of forces between the two ends of a coupled turbo pair allow a simple air bearing design to operate safely and reliably at high rotational speeds.

5 Claims, 2 Drawing Sheets

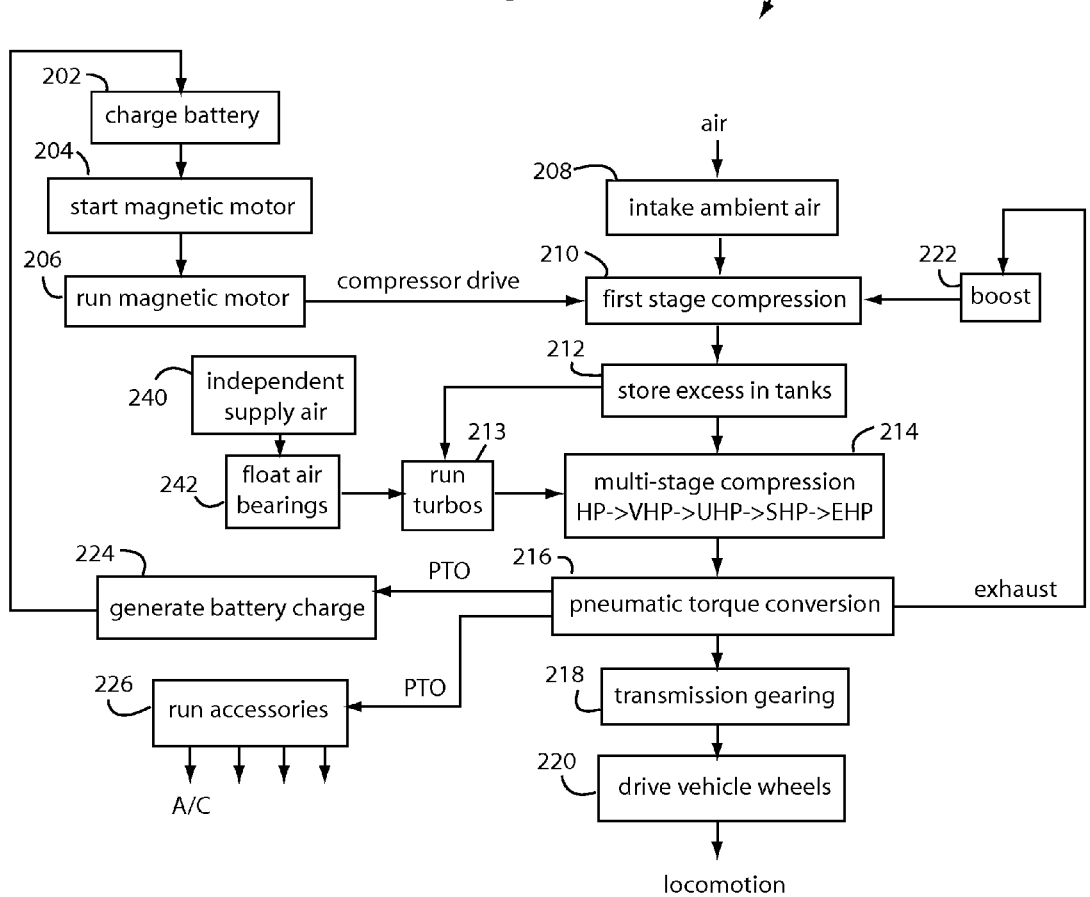

MAGNETIC AIR CAR

FIELD OF THE INVENTION

Figure 1:
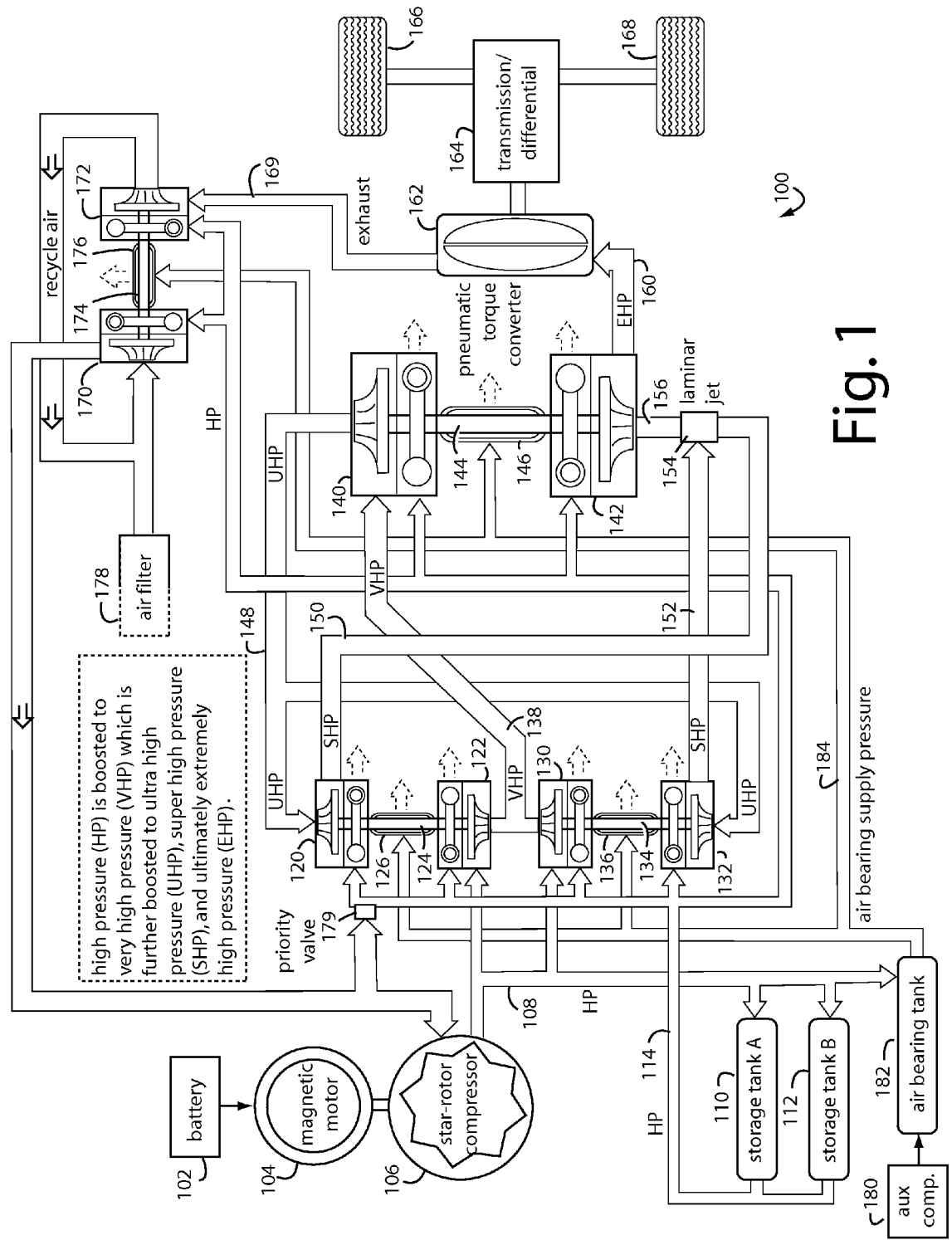

The present invention relates to automobiles, and more particularly to propulsion systems for automobiles that compress air on-board with magnetic motors and use the compressed air from storage tanks and a compressor to propel the vehicle.

DESCRIPTION OF THE PRIOR ART

Gasoline and diesel internal combustion, steam, electric, compressed air, and turbine engines have all been used to propel various kinds of cars and other vehicles. The range limitations of these vehicles depends on how much fuel or energy can be carried on-board until the next fill-up or recharge. The engine efficiencies also figure into the range, the more efficient the engine, the greater will be the range.

New classes of hybrid vehicles are beginning to emerge that have short ranges that can be extended if need be by a small on-board generator. For example, the Chevy Volt plug-in electric car is anticipated to have a range of forty miles on an overnight electric charge of its lithium-ion batteries. Such range is expected to satisfy the needs of over seventy-five percent of America's daily commuters. A small gasoline-powered electric generator on-board automatically starts up if a trip farther than forty miles exhausts the batteries.

Liquid fuels like gasoline, kerosene, and diesel, have a relatively high energy content for their weight and volumes, and are therefore the most common kinds of fuels used in cars, trucks, and buses. Internal combustion engines can convert these fuels into mechanical energy, but they are notoriously inefficient and throw away most of the energy as wasted heat. Less than twenty percent of the energy in the fuel actually drives the wheels.

Compressed gases have been used too, such as compressed hydrogen or propane, which are burned as fuel. Compressed air can be used directly to run an air pump backwards, where the release of pressure drives a piston that turns the wheels. The mechanics are similar to a steam engine without the boilers.

The problem with compressed gases has been the exceedingly high-pressures that have been necessary to make them useful in vehicles. The usual pressures can exceed four thousand PSI. This makes building the storage tanks to contain these pressures very expensive, and the tanks themselves are very dangerous if exposed to collisions or fire. Damaged super-compressed gas tanks can blevy and rocket like a wild missile.

The problem with electric cars is they must carry batteries large enough to power the vehicle. Batteries are inherently heavy, and exotic lightweight batteries are very expensive. The materials used in batteries are often dangerous, e.g., the sulphuric acid in lead-acid cells. The materials are also environmentally harmful, e.g., the lead in lead-acid cells. And a charged battery can generate tremendous heat and explode if electrically shorted, like can occur if punctured or warped in a car collision.

Permanent magnets express magnetic fields constantly, while electro-magnets express their magnetic fields only so long as current is applied and in proportion to the magnitude of the current flowing through their coils. Electric motors use permanent magnets and electro-magnets in their rotors and stators to turn the rotor and produce a mechanical output from an electrical input. The magnets are switched on-and-off according to their relative positions to keep the magnetic fields working in the right directions to produce the rotating torque.

Magnetic fields between respective north and south poles can be warped and steered by shunting them through highly permeable plates, bars, and shutters. The magnetic fields circulating about a permanent magnet can be effectively switched on-and-off from the perspective of a nearby point by moving or manipulating interposing magnetic shunts.

This is one basis for hundreds of different types of permanent magnet electrical generators and reciprocating and rotating magnetic motors. For example, an early magnetic motion conversion device is described by Gerald Howard in U.S. Pat. No. 3,967,146, issued Jun. 26, 1976. Allan Limb describes a magnetic engine in United States Patent Application 2005/0116567, published Jun. 2, 2005. Michael Cristoforo describes a magnetic force reciprocating motor in United States Patent Application 2008/0122299, published May 29, 2008. A generator with reciprocating and rotating permanent magnets is described by Stephen Kundel in U.S. Pat. No. 7,400,069, issued Jul. 15, 2008. Harry Sprain describes a magnetic generator in U.S. Pat. No. 7,265,471, issued Sep. 4, 2007. Using electromagnetism to drive pistons up and down in a reciprocating motor is described by Shimon Elmaleh in U.S. Pat. No. 7,105,958, issued Sep. 12, 2006; and also by Leland Gifford in U.S. Pat. No. 5,457,349, issued Oct. 10, 1995. Albert Schumann describes a permanent magnet motion conversion device in U.S. Pat. No. 4,300,067, issued Nov. 10, 1981. Shielding plates are moved into and out of positions in front of a set of stationary magnets. A carriage then shuttles back and forth.

A whole vehicle with a magnetic engine is described by Charles Wortham in U.S. Pat. No. 5,219,034, issued Jun. 15, 1993. It uses magnetic pistons with electromagnets fitted in the cylinder heads. An AC generator is attached to the rear wheels to recover electrical energy which is then used to charge a battery.

Compressed air cars use the expansion of compressed liquid air into gas to drive the pistons in a pneumatic engine. The idea is not new. Prototypes were built in the 1920's and the ideas were discussed in popular mechanics magazines. Modern torpedo weapons and missile launchers use compressed air as well. Conventional compressed air cars typically use high-pressure tanks of 30 MPa (4500 psi or 300 bar). Carbon-fiber tanks can reduce the weight and still have the necessary strength.

The Zero Pollution Motors (New Paltz, N.Y.) division of Moteur Development International (France) is presently marketing a ZPM Air Vehicle that promises almost zero pollution motoring. See, http://zeropollutionmotors.us/. Their vehicle uses a compressed air engine (CAE) with pistons powered by the expansion of electronically injected compressed air. The CAE has an active chamber and two opposing cylinders in each module. A proprietary connection rod keeps the pistons at top dead center during 70° of crankshaft rotation, in order to maintain the required pressure in the cylinder long enough to get maximum work output. The basic engine modules can be coupled together in groups of four or six cylinders for a range of uses. Each compressed air tank in the ZPM vehicle holds 3,200 ft$^3$ of compressed air at 4,500 psi (310 bar). An on-board plug-in electric compressor is used between trips to generate 812 ft$^3$ of compressed air per hour to recharge the tanks, e.g., four hours or overnight.

The first production units are scheduled for deliveries in 2009. At speeds over 35-mph, the 75-hp (56 kW) CAE uses a compressed air multiplier (CAM) to burn small amounts of fuel, e.g., gasoline, propane, ethanol or bio fuels inside a heating chamber to heat the ambient air as it enters the engine. This is said to produce insignificant emissions of only 0.14 pounds of carbon dioxide per vehicle mile. The fuel economy is expected to be 106-miles per gallon. With an eight-gallon fuel tank, the car is calculated have a range of 848 miles. Guy Negre describes a similar engine in U.S. Pat. No. 7,296,405, issued Nov. 20, 2007, and also United States Patent Application 2007/0101712, published May 10, 2007. The whole car like this is described by him and Cyril Negre in United States Patent Application 2006/0170188, published Aug. 3, 2006.

The recovery of energy during the braking of a car into compressed air is described by Guy Negre and Cyril Negre in U.S. Pat. No. 6,363,723, issued Apr. 2, 2002. The compressed air is then useful later in re-accelerating the vehicle with a pneumatic engine.

SUMMARY OF THE INVENTION

Briefly, a magnetic air car embodiment of the present invention uses a magnetic motor to compress input air and save moderately compressed high-pressure air in storage tanks. The compressor and storage tanks deliver the high-pressure working air and operational flows to several stages of compressors that boost the pressures during driving to very high-pressure, then ultra high-pressure, then super high-pressure, and finally to extremely high-pressure. A pneumatic torque converter uses jets of the extremely high-pressure to turn an input shaft of a transmission and differential. These, in turn, drive the powered wheels of a car. The compressors float a connecting shaft with matching vanes and impellers on opposite ends on air bearings to reduce shaft turning friction to near zero. The balance of forces between the two ends of a coupled turbo pair allows a simple air bearing design to operate safely and reliably at high rotational speeds.

An alternative automobile embodiment of the present invention comprises a magnetic engine that drives an air compressor to fill on-board compressed air tanks. The magnetic engine is started initially by an electric starter motor and battery. Air bearings are used throughout to reduce friction to near zero in the compressors, compressor, magnetic engine, and air cycle engine. The compressed air tanks are filled to only moderate pressures, such as 200-PSI. Compressed air from the tanks and the air compressor is passed through air amplifiers to greatly increase the volume of input air. Amplified air is input to two compressors that are each ducted and driven to function as two-stage compressors. High-pressure jets from these compressors are applied to a pneumatic engine that converts it to rotating mechanical energy to drive the wheels of a car. Exhaust heat and compressed air are recycled by a recuperator to improve efficiency.

These and other objects and advantages of the present invention will no doubt become obvious to those of ordinary skill in the art after having read the following detailed description of the preferred embodiments which are illustrated in the drawing figures.

IN THE DRAWINGS

FIG. 1 is a pneumatic schematic diagram of a magnetic air car embodiment of the present invention; and FIG. 2 is a flowchart diagram of a magnetic air car method embodiment of the present invention.

DETAILED DESCRIPTION OF THE PREFERRED EMBODIMENTS

FIG. 1 represents a magnetic air car embodiment of the present invention, and is referred to herein by the general reference numeral 100. The magnetic air car 100 includes a 12-VDC storage battery 102 to start a magnetic motor 104 by energizing the windings of an internal starter motor. The magnetic motor, once brought up to its starting speed, drives a star-rotor compressor 106. The star-rotor type compressors have rotors which are synchronized not to touch one another during operation.

In one embodiment of the present invention, battery 102 includes a sodium free complex silicon salt electrolyte as described in PCT published patent application WO 01/13454 A1, published Feb. 22, 2001. Greensaver Technology Corporation (Ningbo, China) says they hold a patent for their so-called GREENSAVER BATTERY. Silicone Batteries USA imports these batteries to the US. See, www.siliconebatteriesusa.com/. The silicone battery is marketed as not having most of the bad qualities of lead acid batteries, e.g., high internal resistance, poor cold temperature performance, and significant self discharging rates. Silicone batteries are said to be able to present more than 80% of their total capacity even at temperatures as low as +15° F.

Filtered, ambient air or recycled pressurized air is pumped up to about 200-PSI by star-rotor compressor 106 to produce a high-pressure (HP) supply 108. A pair of tanks 110 and 112 are used to store pressurized air for release as HP supply 114 into a series of step-up compressors.

A first coupled pair of these are compressors 120 and 122 which have a common shaft 124 floated on an air bearing 126. This combination may be referred to herein as primary turbo TWIN1. Similarly, a second pair of compressors 130 and 132 have a common shaft 134 floated on an air bearing 136. This combination may be referred to herein as primary turbo TWIN2. HP supply 114 drives a pelton-type impulse turbine side of each compressor 120, 122, 130, and 136, and the exhaust is released to atmosphere. A pressure multiplication is provided like in a turbofan jet engine on the driven side of each compressor 120, 122, 130, and 136. This produces a very high-pressure (VHP) supply 138 from HP supply 108.

A large coupled pair of compressors 140 and 142 have a common rotating shaft 144 on an air bearing 146. This combination may be referred to herein as a secondary turbo BOOST. Compressors 140 and 142 are driven by HP supply 114. Compressor uses this to step up VHP supply 138 into an ultra high-pressure (UHP) supply 148. The driven sides of compressors 120 and 132 then step this up to a super high-pressure (SHP) supply 150 and 152. Both are applied to a laminar jet 154 to produce a laminar airflow 156 into the driven side of compressor 142.

The final result of all the pressure step-ups through compressors 120, 122, 130, 132, 140, and 142, is extra high-pressure (EHP) supply 160. This is applied to a pneumatic torque converter 162, the hydraulic equivalent of which is a standard automatic transmission torque converter used in automobiles. For example, this includes a pelton-type impulse turbine.

Pneumatic torque converter 162 couples with a driveshaft to a transmission and differential 164. The output torque is then used to drive axles to wheels 166 and 168 of a car. Power throttling is provided by modulating HP supply 108 from the star-rotor compressor 106.

Exhaust 169 from pneumatic torque converter 162 is ducted to a compressor pair 170 and 172. A shaft 174 on an air-bearing 176 couples these together. This combination may be referred to herein as exhaust turbo RECOVERY. Ambient air drawn in by a filter 178, and recycle air from compressor 172, are input to compressor 170. They receive a boost that is applied to the input HP supply 114 through a priority valve 179 to boost acceleration while the car is under way. All ambient air exchange takes place through air filter 178.

The compressor pair 170 and 172, as do the others, provides a multiplication in the compressive pressures in gases that pass through the vanes of the driven sides. The multiplication is on the order of 5× to 7×.

An independent air bearing supply system includes a 12-VDC electric compressor 180, a dedicated air storage tank 182, and an air bearing supply pressure 184. A control system included with magnetic air car 100 must float all the air bearings 126, 136, 146, and 176 first, before allowing any supply pressure 108 or 114 to spool up any of the compressors. Any loss of air bearing supply pressure 184 must be immediately used to shut down supply pressure 108 and 114 to stop the compressors spinning. Air bearings could also be usefully employed in magnetic motor 104, star-rotor compressor 106, and torque converter 162. The 12-VDC electric compressor 180 could be powered by battery 102.

Accessories, other than electrically powered ones like power steering and power windows, can be provided with a mechanical power take off (PTO) from magnetic motor 104 or pneumatic torque converter 162. A small pneumatic motor could also be used to drive accessories like air conditioning, alternators, and generators from taps on the HP supply 108 or discharge from compressor 172.

The compressors are put in pairs around respective air bearings 126, 136, 146, and 176 to balance the lateral forces applied to the vane ends of shafts 124, 134, 144, and 174. A proper balance eliminates Milankovitch-like wobbles, e.g., changes in the axial tilt, axial precession, and eccentricities of the turbo-shafts 124, 134, 146, and 176 over periods of time.

A particular type of oil-free air bearing used in connection with a turbocharger is reported by Minoru Ishimo, "Air Bearing for Automotive Turbocharger", in R&D Review of Toyota CDRL, Vol. 41, No. 3, (c) 2006, Toyota Central R&D Labs, Inc. Some of the details in the article may be useful in implementing compressors 120, 122, 130, 132, 140, 142, 170, and 172.

Magnetic motor 104 could be implemented by consulting any number of articles, whitepapers, United States Patents and Patent Application on the subject, or purchased as a ready-to-install engine from several suppliers now or soon-to-be marketed such products. For example, see CYC-CLONE MAGNETIC ENGINES developed in Queensland, Australia, and represented in the United States by Cycclone Magnetic Engines, Inc., Reno, Nev. (www.cycclone.us). And see, Perendev Magnetic Motor (Perendev-Power.com). For patents, see, MAGNETIC ENGINE, by Allan Limb, UNITED STATES PATENT APPLICATION 2005/0116567, published Jun. 2, 2005. The MAGFORCE piston engine from Shinyeon Energy Research Center of Korea (www.shinyeonenergy.com).

Jun. 13, 2007, Kedron Corporation (Fairview, Tenn.) issued a news release, "Kedron Corporation Discovers a New Energy Source that is Extremely Inexpensive, Abundant and Pollution-free", which can be seen at www.kedroncorp.com/pressrelease.html. And see, "Harnessing Mechanical Energy From Strong Electromagnetic Forces Generated By The Spin Of Electrons", accessible on the Internet at www.kedroncorp.com/abstract.html.

In general, a magnetic air car uses a magnetic motor to compress input air and save moderately compressed high-pressure (HP) air in storage tanks. The compressor and storage tanks deliver the high-pressure working air and operational flows to several stages of compressors that boost the pressures during driving to very high-pressure (VHP), then ultra high-pressure (UHP), then super high-pressure (SHP), and finally to extremely high-pressure (EHP). A pneumatic torque converter uses jets of the EHP to turn an input shaft of a transmission and differential. These, in turn, drive the powered wheels of a car. The compressors float a connecting shaft with matching vanes and impellers on opposite ends on air bearings to reduce shaft turning friction to near zero. The balance of forces between the two ends of a coupled turbo pair allows a simple air bearing design to operate safely and reliably at high rotational speeds.

One theory of operation for a practical magnetic motor was offered at peswiki.com by:

A magnet generates mechanical energy or does work when for example it pulls toward another magnet or a piece of metal. The powerful magnetic forces of two neodymium magnets can do much more work than simply pull themselves together over a distance. For example, welders put neodymium magnets to work to hold metal parts together for welding. However, the welder must also do work when pulling the magnet away from the metal. Many of us have contemplated the notion of putting permanent magnets to work to turn the wheels on a vehicle or to drive an electric generator without the addition of external energy. For example, if the welder could remove the magnet with little or no effort (work) then the magnet would have delivered a "net" amount of work. Imagine two powerful magnets pulling themselves together with great force. The work that is done as they pull themselves together could be used to turn an electric generator. However, not much work would be obtained from only one such event. To obtain more work in this manner the magnets must be pulled apart repeatedly so that they can continuously do work by repeatedly pulling themselves together. The amount of energy spent pulling them apart has to be significantly less than the amount derived when they come together thus leaving a useful net-yield of energy that is applied to turning the generator. Pulling two magnets apart along the same path they took to pull themselves together will of course require as much (or more) energy as the amount generated by the magnets when they come together. However, it has been discovered recently that two permanent magnets of a particular shape can be pulled apart along a prescribed path that requires less work compared to the amount of work produced when the magnets come together along a different path. This is possible because permanent magnets have at least one North and one South Pole, which gives polarity to their magnetic fields making the fields and the force in the field unevenly distributed. In an uneven field of magnetic force, it is not difficult to imagine different paths having different forces and thereby generating different amounts of work.

Star-rotor compressor 106 can be like the fifth generation products marketed by StarRotor Corporation, Bryan, Tex. (See, starrotor.com). The Company reports that their compressor can process any vapor or gas with the only associated design consideration being the selection of materials compatible with the gases being compressed. The compressor works by using inner and outer star rotors, with seven and eight points respectively, that rotate on corresponding axes. A drive mechanism synchronizes the rotors so they do not bear on one another. Seals made with sacrificial coatings are used between the rotors and stationary porting components.

As the rotors turn, a chamber enlarges, reaches a maximum volume, and then squeezes closed. Inlet gas enters through the intake port as the void opens. Once the gas is captured, the chamber volume is squeezed causing the pressure to increase. After a design pressure is reached, the gas pushes out through a discharge port. The chamber ports open eight times per rotation of an outer rotor, allowing the compressor to process large volumes of gas. The position of the leading edge of the discharge port determines the compression ratio. If the leading edge is positioned to make the discharge port large, the compression ratio will be small. If the leading edge is positioned to make the discharge port small, the compression ratio will be high. By using a sliding mechanism, the leading edge position can be changed on the fly, giving the compressor a variable compression ratio. A magnetic motor could be integrated within to drive the compressor.

In operation, an electric motor driving auxiliary compressor 180 immediately begins filling the air bearing tank 182 when an ignition key is turned to the run position. The air bearing tank 182 supplies the pressurized air needed to suspend the air bearing loads of each component, e.g., 40-PSI @ 3.8 cubic feet per minute (cfm). Pressure sensors detect when a predetermined minimum operating pressure is present, and the magnetic motor 104 and star-rotor compressor 106 are allowed to start-up. Auxiliary compressor 180 is cycled on-off by pressure controller switches to keep a constant supply of compressed air in the air bearing tank 182.

When the car is not in use, the air bearings do not need to remain suspended. A timer is used to allow the air bearing equipped components to spin down. After enough inertia has been spent and the possibility of damage to the air bearings has been reduced to zero, the timer shuts-off air flow from the air bearing tank 180, and the car and all its engine components are stopped.

FIG. 2 represents a magnetic air car method embodiment of the present invention, referred to herein by the general reference numeral 200. Method 200 includes a step 202 for charging a storage battery, a step 204 for using that storage battery to start a magnetic motor, and a step 206 for running that magnetic motor on-board a vehicle.

A step 208 draws in filtered air into a compressor. A step 210 provides a first stage of compression by driving the compressor with the magnetic motor. A step 212 stores the compressed air at an HP level, at about 200-PSI, in storage tanks on-board the vehicle. A portion of the compressed air at HP level is used in a step 213 to simultaneously power a totem-pole series of compressors. A step 214 provides multiple stages of air compression that begin with HP to VHP, then VHP to UHP, then UHP to SHP, and finally SHP to EHP levels. A step 216 uses EHP level compressed air in a pneumatic toque conversion to drive an input shaft to a transmission/differential. A step 218 provides gearing in that transmission, including several forward speeds, neutral, and reverse. A step 220 drives the vehicle's wheels to provide locomotion. Useful power is still available in an exhaust from the pneumatic toque conversion step 216, so a boost step 222 provides pressurized boost air to step 210 through a priority valve. Such boost may be needed for quick acceleration and passing other cars.

A power take-off (PTO) allows a step 224 to generate a battery charge, and a step 226 to run accessories like air conditioning.

If air bearings are used, a step 240 independently produces an air bearing supply pressure, and a step 242 uses such pressure to float the bearings of the compressors before they are allowed to spool-up. Such air bearing supply pressure is maintained until well after spool-down of the compressors.

Referring again to FIG. 1, an extra boost can be had by changing compressor 172 to be a drive turbine type, instead of a compressor. This would facilitate high altitude applications, such as is needed in airplanes. An additional fifth turbocharger could be added to increase high altitude operation even more.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A magnetic air car vehicle, comprising:
   a magnetic motor in which permanent magnets are used to turn an output shaft without using electromagnetic components;
   a first compressor connected to be driven by the magnetic motor and for producing compressed air at a high-pressure (HP) level, about 200-PSI;
   storage tanks on-board said vehicle for receiving compressed air at said HP level from said first compressor;
   a series of compressors ducted in totem-pole fashion to multi-stage compress said compressed air from the storage tanks and first compressor beginning with HP level to a very high-pressure (VHP) level, then from said VHP level to an ultra high-pressure (UHP) level, then from said UHP level to a super high-pressure (SHP), and finally from said SHP level to an extremely high-pressure (EHP) level of compressed air;
   a pneumatic torque converter for converting said EHP level of compressed air to drive an output shaft;
   a transmission/differential connected to receive said output shaft from the pneumatic torque converter, and that includes forward speeds, a neutral, and a reverse; and
   wheels connected to provide locomotion from the transmission/differential;
   wherein each in said series of compressors is driven in parallel with the others by a common source of compressed air at said HP level from the storage tanks and compressor.

2. The vehicle of claim 1, wherein the first compressor is a star-rotor type in which the rotors are synchronized not to touch one another during operation.

3. A magnetic air car method, comprising:
   charging a storage battery;
   using said storage battery to start a magnetic motor;
   operating said magnetic motor on-board a vehicle;
   drawing in filtered air into a first compressor;
   providing a first stage of compression to said filtered air by driving said first compressor with said magnetic motor;
   storing compressed air at a high-pressure (HP) level, at about 200-PSI, in storage tanks on-board said vehicle;
   using a portion of said compressed air at HP level to simultaneously power a totem-pole series of compressors;
   compressing said filtered air in multiple stages beginning with HP level to a very high-pressure (VHP) level, then VHP level to an ultra high-pressure (UHP) level, then UHP level to a super high-pressure (SHP), and finally SHP level to an extremely high-pressure (EHP) level of compressed air;
   pneumatic torque converting said EHP level of compressed air to drive an input shaft to a transmission/differential;

gearing said transmission to include forward speeds, a neutral, and a reverse;
driving the wheels of said vehicle to provide locomotion; and
providing a pressurized boost air through a priority valve from an exhaust from said pneumatic toque conversion to supplement said compressed air at HP level.

4. The method of claim 3, further comprising:
using a power take-off (PTO) to generate a battery charge and to run air conditioning and other accessories.

5. The method of claim 3, further comprising:
using air bearings in said compressors; and
independently producing an air bearing supply pressure to float said air bearings before said compressors are allowed to spool-up; and
maintaining said air bearing supply pressure until after a spool-down of said compressors.

* * * * *